United States Patent [19]
Kishi et al.

[11] Patent Number: 5,832,248
[45] Date of Patent: Nov. 3, 1998

[54] SEMICONDUCTOR INTEGRATED CIRCUIT HAVING CPU AND MULTIPLIER

[75] Inventors: Kazumasa Kishi, Akishima; Shigeki Masumura, Kodaira; Hideo Nakamura, Tokyo; Kouki Noguchi, Kokubunji; Shumpei Kawasaki, Kodaira; Yasushi Akao, Kokubunji, all of Japan

[73] Assignees: Hitachi, Ltd.; Hitachi ULSI Engineering Co., Ltd., both of Tokyo, Japan

[21] Appl. No.: 555,262

[22] Filed: Nov. 8, 1995

Related U.S. Application Data

[63] Continuation of Ser. No. 145,157, Nov. 3, 1993, abandoned.

[30] Foreign Application Priority Data

Nov. 6, 1992 [JP] Japan .................................... 4-296778

[51] Int. Cl.$^6$ .................................................. G06F 12/00
[52] U.S. Cl. ................... 395/376; 395/800.34; 395/562; 395/306
[58] Field of Search .................................. 395/284, 306, 395/309, 800, 800.34, 376, 562

[56] References Cited

U.S. PATENT DOCUMENTS

| | | |
|---|---|---|
| 4,335,446 | 6/1982 | Gandini et al. ........................... 375/80 |
| 4,627,021 | 12/1986 | Persoon et al. ..................... 395/800.36 |
| 4,876,644 | 10/1989 | Nuechterlein et al. .............. 395/800.3 |
| 4,894,768 | 1/1990 | Iwasaki et al. . |
| 5,056,015 | 10/1991 | Baldwin et al. ......................... 395/500 |
| 5,086,407 | 2/1992 | McGarity et al. ...................... 395/841 |
| 5,201,036 | 4/1993 | Yoshimatsu ............................. 395/287 |
| 5,239,641 | 8/1993 | Horst ....................................... 395/553 |

FOREIGN PATENT DOCUMENTS 0 318 602 A2  6/1989  European Pat. Off. .

*Primary Examiner*—Jack B. Harvey
*Assistant Examiner*—Jeffrey K. Seto
*Attorney, Agent, or Firm*—Antonelli, Terry, Stout & Kraus, LLP

[57] ABSTRACT

A logic LSI chip includes a CPU, a bus, a memory, and a multiplier. In addition, the logic LSI chip includes a command signal line for transferring, from the CPU to the multiplier, a command regarding a multiplication instruction relating to data read out, while the data is being read out from the memory, so that the multiplier can fetch the data directly from the bus. While the CPU is reading data from the memory, therefore, a command of a multiplication instruction relating to data read out is transferred from the CPU to the multiplier. A bus cycle control circuit receives a state signal from the multiplier when the multiplier is executing a repetitional operation and the bus cycle control circuit responds to the state signal by signalling the CPU to delay issuance of a succeeding command to the multiplier.

17 Claims, 2 Drawing Sheets

SEMICONDUCTOR INTEGRATED CIRCUIT HAVING CPU AND MULTIPLIER

This application is a continuation of application Ser. No. 08/145,157, filed on Nov. 3, 1993.

BACKGROUND OF THE INVENTION

The present invention relates to a logic LSI having a central processing unit (CPU) and a memory, and in particular to a single chip microcomputer requiring high speed signal processing.

Prior to the present invention, the present inventors considered the possibility of incorporating a multiplier capable of performing high speed signal processing into a chip of a single chip microcomputer, including an arithmetic logic unit (ALU), for executing logical operations, such as addition, a logical product operation and a logical sum operation.

FIG. 3 shows the configuration of a chip according to an example thereof.

As shown in FIG. 3, a microcomputer includes a central processing unit (CPU) 1, a memory 3, a data bus 4, and an address bus 5. An instruction read out from the memory 3 according to an address on the address bus 5 is stored in an instruction register 9 and then supplied to a control circuit 10, thereby a control signal 12 is generated.

An instruction execution unit 11 in the CPU 1 includes a data buffer 13 connected to the data bus 4, an address buffer 14 for driving the address bus 5, an ALU 15, internal registers 16 of the CPU, and internal buses 17 through 19 of the CPU. In particular, a multiplier 22 is formed within the instruction execution unit 11 of the CPT 1 and connected to the buses 17, 18 and 19 included in the instruction execution unit 11. Data in the memory 3 are fetched into the CPU 1 via the data bus 4 and subjected to operational processing in the instruction execution unit 11.

FIG. 4 shows the configuration of a chip according to another example. A multiplier 23 is connected to the data bus 4 and the address bus 5. Hence, the multiplier 23 is disposed on an address map capable of being subjected to access control from the CPU 1.

When data in the memory 3 is to be subjected to multiplication, first the data is fetched into the CPU 1 via the data bus 4 and the writing is conducted to the address-mapped multiplier 23, whereby the multiplication operation is started. Also, in case the operation result produced by the multiplier 23 is to be stored in the memory 3, first the data is fetched into the CPU 1 and then the data is written into the memory 3.

SUMMARY OF THE INVENTION

With a multiplier conducting a so-called repetitional operation, a product is derived by dividing input bits into a plurality of parts, performing multiplication for the divided input parts to obtain partial products, and then the product for the input bits as a whole is obtained. By configuring such a multiplier to perform a repetitional operation, a trade-off between the occupation area and processing time is attained. By adopting a multiplier using this repetitional operation method, a multiplier satisfying the necessary performance and having a minimum occupation area can be formed.

In the example shown in FIG. 3, however, the multiplier 22 is incorporated into the instruction execution unit 11, which is conventionally laid out by using macro-cells. At the time of performance modification of the multiplier, therefore, layout design modification is difficult. This point has not been considered.

On the other hand, in the example shown in FIG. 4, the CPU 1 and the multiplier 23 are formed as different modules. In the configuration, therefore, layout modification is facilitated. However, data transfer between the memory 3 and the multiplier 23 cannot be directly performed, and processing for initially fetching data into the CPU 1 is required. Therefore, consideration for attaining higher speed has been restricted.

Therefore, an object of the present invention is to provide a semiconductor integrated circuit which facilitates design modification compatible with the target performance of the multiplier and which allows direct transfer of data between the memory and the multiplier.

In order to achieve the above described object, semiconductor integrated circuit according to a representative implementation form of the present invention includes, on its chip, a CPU (1), a bus (5, 4) for transmitting an address and data from the CPU, a memory (3) coupled to the bus (5, 4) and accessible according to the address supplied from the CPU, a multiplier (2) coupled to the CPU (1) via the bus (4), and a command signal line (6) for transferring, from the CPU (1) to the multiplier (2), a command of a multiplication instruction relating to data read out, while the data are being read out from the memory (3) via the bus (4) in response to an access address outputted from the CPU (1) to the bus (5).

On the other hand, if the multiplier is formed by using an operation device for performing a repetitional operation method requiring a minimum area, the chip size can be reduced and a lower cost is attained. In view of a drop in processing capability, however, it becomes necessary to execute one multiplication instruction by a repetitional operation in the multiplier (2). While the multiplier (2) is executing the repetitional operation of the multiplication instruction, therefore, the CPU (1) cannot start operation of a succeeding multiplication instruction.

In view of such repetitional operation, therefore, a semiconductor integrated circuit according to a preferred embodiment of the present invention is so configured that the multiplier (2) may output a state signal (8) indicating that the multiplier (2) is executing a repetitional operation of the multiplication instruction, and a bus cycle control circuit (20) responsive to the state signal operates to prolong a bus cycle relating to issuance of a succeeding command from the CPU (1) to the command signal line (6).

According to a representative embodiment of the present invention, the CPU (1) and the multiplier (2) are formed as different modules, for example, the CPU and the multiplier are formed in different (isolated) regions within the same chip, coupled via a bus (4). When the performance of the multiplier (2) is changed, therefore, the CPU (1) becomes irrelevant and layout design modification is facilitated. Furthermore, there is provided on the chip a command signal line (6) for transferring, from the CPU (1) to the multiplier (4), a command of a multiplication instruction relating to data read out, while the data are being read out from the memory (3) via the bus (4) in response to an access address outputted from the CPU (1) to the bus (5). Therefore, data can be directly transferred between the memory (3) and the multiplier (2).

According to a preferred embodiment of the present invention, in case a state signal (8) indicates that the multiplier (2) is executing a repetitional operation of the multiplication instruction, the bus cycle control circuit (20) prolongs a bus cycle for issuance of a succeeding command from the CPU (1) to the command signal line (6). Therefore, it becomes possible to avoid a possible malfunction in which the bus cycle for issuance of a succeeding command is permitted and instruction execution of the succeeding command is started before instruction execution of a current command is completed.

Other objects and features of the present invention will become obvious from the following description of a preferred embodiment.

DESCRIPTION OF THE PREFERRED EMBODIMENTS

Figure 1:
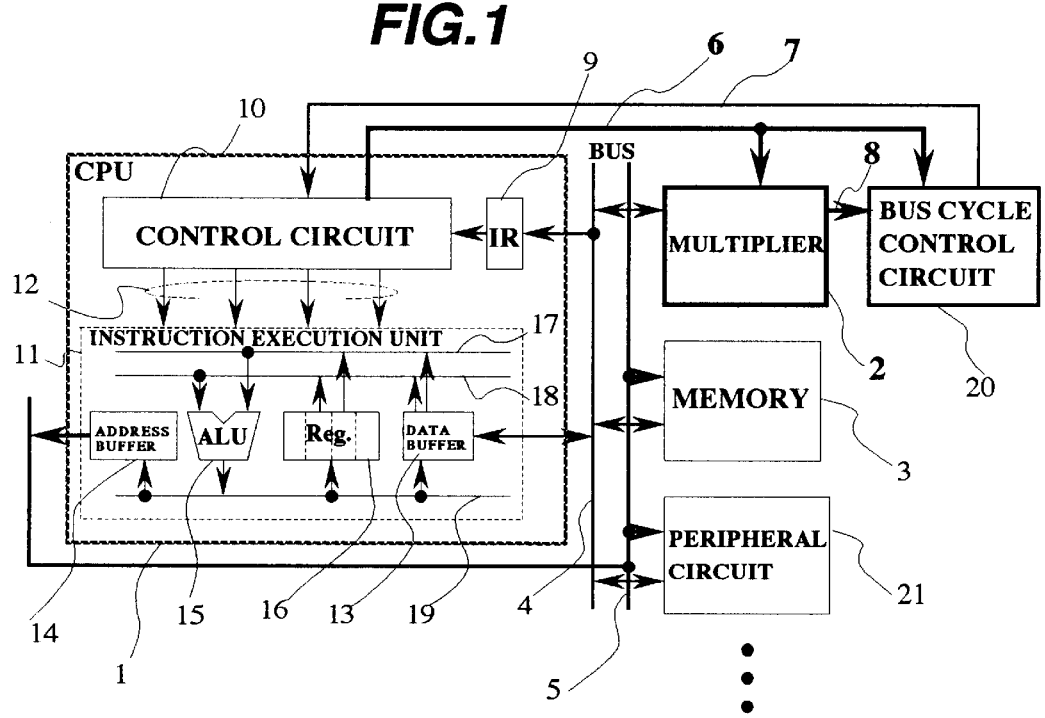
FIG. 1 is an internal block diagram of a single chip microcomputer having a built-in multiplier according to an embodiment of the present invention.

FIG. 1 is an internal block diagram of a chip of a single chip microcomputer having a built-in multiplier 2 according to an embodiment of the present invention. This multiplier capable 2 is a multiplier of a repetitional operation method as described above.

A processor CPU 1 is connected to the multiplier 2, a memory 3, and a peripheral circuit 21, such as a timer and a serial communication interface. By an address outputted from the CPU 1 and transmitted to an address bus 5, the memory 3 and the peripheral circuit 21 are accessed.

The CPU 1 includes an instruction register 9 for temporarily storing an instruction code read out from the memory 3 or the like via the data bus 4, a control circuit 10 for decoding an instruction code read out to generate a control signal 12 for an instruction execution unit 11 or the like, and the instruction execution unit 11 for executing operational processing. Within the instruction execution unit 11, an address buffer 14, an ALU 15, internal registers 16, and a data input/output buffer 13 are connected to internal data buses 17, 18 and 19.

The CPU 1 reads out an instruction code stored in the memory 3 via the data bus 4 and fetches the instruction code into the instruction register 9. The fetched instruction is decoded by the control circuit 10 to output the control signal 12 internal to the CPU. By this control signal 12, the instruction execution unit 11 is controlled to execute a desired operation.

Furthermore, in the present embodiment, the multiplier 2 is connected to the CPU 1 via the data bus 4 and a command control signal line 6. To this multiplier 2, a bus cycle control circuit 20 is connected via an internal state signal line 8 and the circuit 20 is connected to the CPU 1 via wait signal line 7.

A command control signal 6 fed from the control circuit 10 of the CPU 1 is inputted to the multiplier 2. The internal state of the multiplier 2 is transmitted to the bus cycle control circuit 20 via the signal line 8. To prevent a subsequent operation start command 6 from being issued by this internal state signal 8 and the command control signal 6 during operational processing conducted in the multiplier 2, a wait signal 7 for keeping a bus cycle waiting is generated. This wait signal 7 is inputted to the control circuit 10 of the CPU 1.

Hereafter, execution of a multiplication instruction will be described in detail.

As for the multiplication instruction, there is a case where an operation is executed for data stored in the internal register 16 of the instruction execution unit 11 in the CPU 1, and a case where an operation is executed for data stored in the memory 3.

First of all, assuming that the instruction fetched into the instruction register 9 calls for an operation to be conducted for data stored in the internal register 16, the instruction will be decoded in the control circuit 10. Thereby, the instruction execution unit 11 is controlled to output the contents of the registers 16 to the data bus 4 via the input/output buffer 13. As for the control of the data bus 4, this processing is similar to a write operation to the memory 3. However, an address 5 is not outputted and access to the memory 3 or the like is not performed. At the same time, the control circuit 10 of the CPU 1 issues a command 6 for fetching data existing on the data bus 4 and starting a multiplication processing to the multiplier 2. As a result, the multiplier 2 fetches data from the registers 16 via the data bus 4 and starts the multiplication processing.

The case where an instruction, for executing multiplication for data stored in on the memory 3, has been set in the instruction register 9 will now be described. The control circuit 10 decodes this instruction code, generates the address of the memory 3 containing data to be multiplied, and outputs this memory address to the address bus 5 via the address buffer 14. Data read access is performed for the memory 3 or the like. At the same time, a command, similar to the command which commanded multiplication for the data stored in the internal registers 16, is issued to the multiplier 2 via control command signal line 6. To the data bus 4, the memory 3 outputs data stored at the address on bus 5 outputted from the CPU 1. The multiplier 2 fetches this data and starts multiplication processing.

On the other hand, an operation result obtained by processing in the multiplier 2 is written back into the internal registers 16 of the CPU 1 or the memory 3. This processing can also be executed by conducting data transfer via the data bus 4 in the same way as multiplication start processing.

Figure 2:
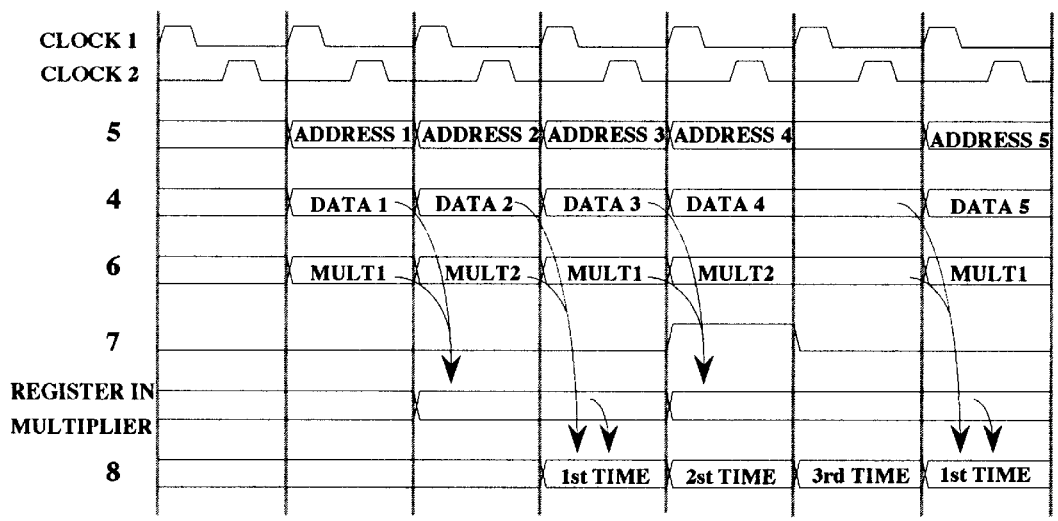
FIG. 2 is a timing chart illustrating the operation of the single chip microcomputer of the embodiment shown in FIG. 1.
Figure 3:
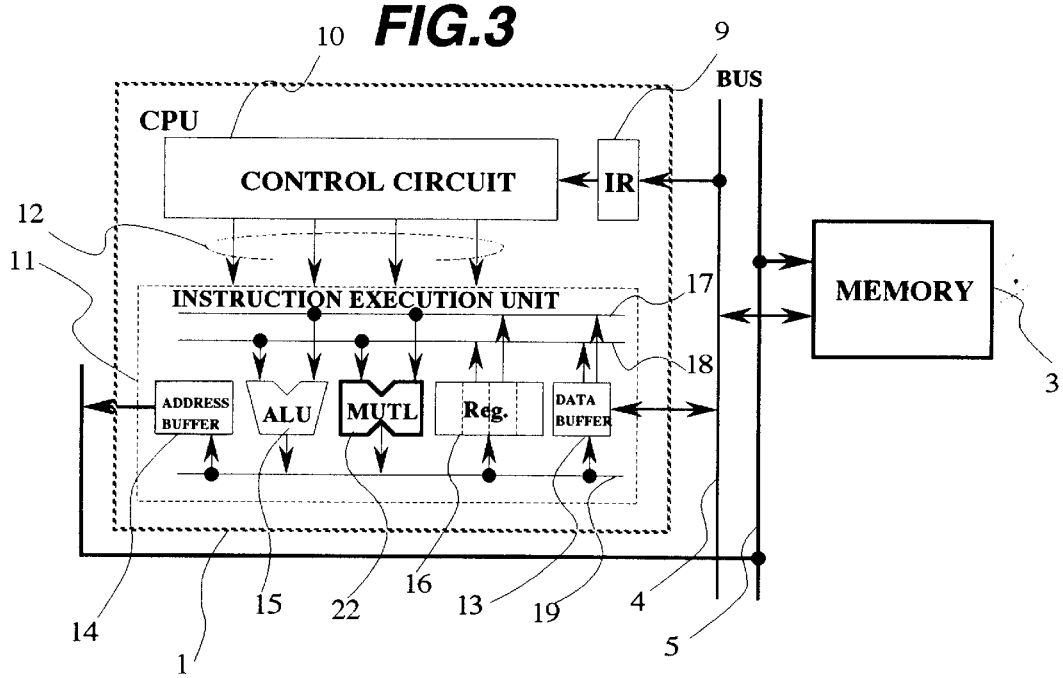
FIG. 3 is an example of an internal block diagram of single chip microcomputer studied by the present inventors prior to the present invention.
Figure 4:
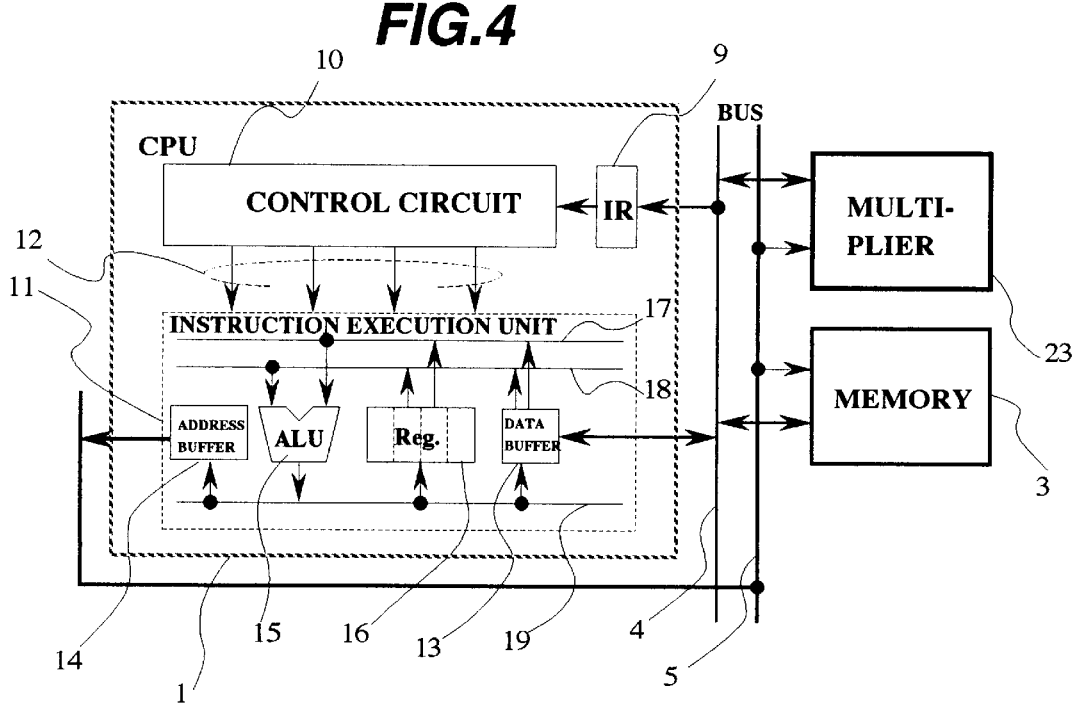
FIG. 4 is another example of the internal block diagram of single chip microcomputer studied by the present inventors prior to the present invention.

FIG. 2 shows a timing chart of the case where multiplication processing is conducted. In this timing chart, it is assumed that the multiplier capable of the repetitional operation method shown in FIG. 1 executes one unit of multiplication processing by conducting a repetitional operation of three cycles.

In a case in which the instruction set in the instruction register 9 is an instruction for executing multiplication for data in the memory 3, an address 1 associated with the data to be multiplied is outputted from the address buffer 14 to the address bus 5. Thereby, data 1, which is data to be multiplied associated with the address, is read out from the memory 3 and outputted to the data bus 4.

On the other hand, in a case in which the instruction set in the instruction register 9 is an instruction for executing multiplication for data stored in the registers 16, the address 1 is not outputted to the address bus 5. With the same timing as that of the case where multiplication is executed for data in the memory, however, the contents of the internal registers 16 in the instruction execution unit 11 to be multiplied are outputted, via data buffer 13, to the data bus 4 as data 1.

In response to a MULT1 instruction the contents of which are included in the command signal 6 outputted from the CPU 1 to the multiplier 2 in synchronism with outputting of the data to be multiplied to the data bus 4, the multiplier 2 stores the value of the data 1 in registers included in the multiplier. Since the MULT1 instruction is a transfer instruction for transfer of multiplication data, a multiplication operation is not started yet. In response to a subsequent instruction for the CPU 1 set in the instruction register 9, address 2 and data 2 are respectively outputted to the address bus 5 and the data bus 4 in the same way as the address 1 and the data 1. In synchronism with this, MULT2, which is contents of the command signal 6 supplied from the CPU 1 to the multiplier, is outputted. In the same way as the MULT1 instruction, the MULT2 instruction is an instruction for fetching the data value 2 existing on the data bus 4 into the multiplier. At the same time, the MULT2 instruction is an instruction for starting, in the multiplier 2, multiplication of this data value 2 by the data value 1 fetched according to the MULT1 instruction, from a bus cycle succeeding a bus cycle in which the data 2 has been fetched. The operation state of the multiplier 2 caused by the started instruction is reflected in the bus cycle control circuit 20 by the internal state signal 8. In the present embodiment, the started multiplication instruction is completed by executing repetitional operation in the multiplier 2 three times.

In case a data value 3 is fetched by the MULT1 instruction of the second time, multiplication of the data value 3 according to the MULT1 instruction of the second time has not been started in the multiplier 2 and a signal 7 for prolonging the bus cycle is not outputted. That is to say, even if, during execution of multiplication processing of the MULT2 instruction of the first time using the data value 1 and the data value 2, an address 3, data 3 and the MULT1 instruction of the second time for succeeding multiplication processing are issued, this MULT1 instruction of the second time is not a multiplication start instruction. Even if this MULT1 instruction of the second time is executed and the value of the data 3 is fetched into the registers included in the multiplier 2, therefore, malfunction does not occur. In case MULT2 of the second time, which is a multiplication processing start instruction, has been issued, the multiplier 2 is executing the repetitional multiplication of the second time of the data value 1 by the data value 2 according to the MULT2 instruction of the first time, and hence the multiplier 2 cannot execute this MULT2 instruction of the second time in a succeeding cycle. In this case, therefore, the bus cycle control circuit 20 discriminates, on the basis of the internal state signal 8 and the CPU command signal 6, that the multiplier 2 is not ready to execute the MULT2 instruction in the succeeding cycle. The bus cycle control circuit 20 thus outputs the bus cycle prolonging signal 7 and thereby prolongs the bus cycle until the multiplier 2 becomes ready to execute the MULT2 instruction. That is to say, in this case, the CPU 1 outputs the same address 4 and the same data 4 to the address bus 5 and the data bus 4, respectively, during two cycles.

As described above, the number of repetitional operation cycles required for the multiplier 2 to complete the multiplication processing is three. If it is finished to output the memory access prolonging signal 7 at the time when the second cycle of repetitional operation has been finished, therefore, it becomes possible to start the multiplication operation using the data value 3 and the data value 4 from a cycle succeeding the cycle during which the repetitional processing of the third cycle has finished. Furthermore, since the memory cycle for the address 4 and the data 4 has been executed, the CPU 1 can start outputting a succeeding address 5, succeeding data 5, and the MULT1 instruction of the third time.

An embodiment of the present invention has heretofore been described in detail. However, the present invention is not limited to this embodiment. It is a matter of course that various modifications are possible within the range of the technical thought of the present invention.

For example, an embodiment having the data bus 4 separated from the address bus 5 has been described. As a matter of course, however, the present invention can be applied to such a method that an address and data are transferred on a common bus in a time division scheme.

Furthermore, in the present embodiment, the number of cycles required to execute one unit of processing in the multiplier is three. However, it is evident that similar control can be exercised even if the number of cycles is changed.

The present invention is especially suitable for adoption in ASIC (Application Specific IC) having a multiplier, a peripheral circuit and the like designed optimally in order to attain the target performance of the customer maximally.

According to the present invention, the multiplier and the CPU can be configured as different modules. Therefore, a multiplier conforming to the target performance can be easily combined with the CPU and used. As a result, the chip size can be minimized according to the target performance. Furthermore, since data transfer between the CPU and the multiplier can be made directly, wasteful bus cycles are not required, resulting in higher speed.

What is claimed is:

1. A semiconductor integrated circuit chip comprising:
   a central processing unit (CPU);
   a bus for transmitting an address and data from said CPU;
   a memory coupled to said bus and accessible in response to an access address supplied from said CPU on said bus;
   a multiplier coupled to said CPU via said bus for performing a multiplication on data supplied thereto from said CPU or said memory; and
   a command signal line for transferring, from said CPU to said multiplier, a command regarding a multiplication instruction relating to data read out, while the CPU is executing a data preparing operation to provide data to be multiplied by the multiplier on the bus, wherein the CPU executes said data preparing operation two times in order for one multiplication operation to be effected, the data preparing operation executed the first time provides first data, as data to be multiplied, on the bus, the data preparing operation executed the second time provides second data, as data to be multiplied, on the bus, and the multiplier executes multiplication of the second data and the first data.

2. A semiconductor integrated circuit chip according to claim 1, wherein said multiplier outputs a state signal indicating that said multiplier is executing a repetitional operation of said multiplication instruction, and further including:
   a bus cycle control circuit connected to said CPU and responsive to said state signal for supplying a signal to said CPU to prolong a bus cycle relating to issuance of a succeeding command from said CPU to said command signal line.

3. A semiconductor integrated circuit chip according to claim 2, wherein said bus comprises an address bus and a data bus.

4. A semiconductor integrated circuit chip according to claim 1, wherein said bus comprises an address bus and a data bus.

5. A semiconductor integrated circuit chip according to claim 1, wherein the CPU includes:
   an instruction register coupled to the bus for holding an instruction;
   a control circuit decoding an instruction held in the instruction register and producing control signals; and
   an execution unit whose operation is controlled by the control signals,
   wherein the control circuit is coupled to the command signal line to selectively issue a command of a multiplication instruction according to the decoding of an instruction held in the instruction register.

6. A semiconductor integrated circuit chip according to claim 1, wherein the data and the access address are supplied through said bus by time-division multiplexing.

7. A semiconductor integrated circuit chip comprising:
   a central processing unit (CPU);
   an address bus coupled to the CPU on which an address is transmitted from the CPU;
   a data bus coupled to the CPU on which data is transmitted;
   a memory, coupled to the address bus and to the data bus, and which is accessible according to an access address supplied, via said address bus, from the CPU;
   a multiplier coupled to the data bus and responsive to a command, from the CPU, regarding a multiplication instruction for fetching data to be multiplied from the data bus and for performing a multiplication on data fetched therein; and
   a command signal line coupled between the CPU and the multiplier on which the command regarding the multiplication instruction is transferred from the CPU to the multiplier, wherein the CPU issues the command of the multiplication instruction to the multiplier through the command signal line, while the CPU is executing a data preparing operation to provide data to be multiplied by the multiplier on the data bus, the data preparing operation executed the first time provides first data, as data to be multiplied, on the data bus, the data preparing operation executed the second time provides second data, as data to be multiplied, on the data bus, and the multiplier executes multiplication of the second data and the first data.

8. A semiconductor integrated circuit chip according to claim 7, wherein the multiplier outputs a status signal indicating that the multiplier is executing repetitional operation of said multiplication instruction, and wherein the semiconductor integrated circuit chip further comprises:
   a bus cycle control circuit coupled to the CPU and responsive to the status signal for providing to the CPU a signal to prolong a bus cycle relating to issuance of a succeeding command of a multiplication instruction from the CPU to the command signal line.

9. A semiconductor integrated circuit chip according to claim 7, wherein, in said data preparing operation, data to be multiplied is read from the memory to the data bus in response to an access address outputted from the CPU to the address bus.

10. A semiconductor integrated circuit chip according to claim 7, wherein, in said data preparing operation, data to be multiplied is generated from the CPU and applied to the data bus.

11. A semiconductor integrated circuit chip according to claim 7,
   wherein the multiplier includes a register, and
   wherein a multiplication command issued from the CPU to the multiplier via the command signal line for one multiplication includes:
      a first instruction for fetching first data on the data bus into the register of the multiplier, and
      a second instruction for fetching second data into the multiplier and for starting, in the multiplier, multiplication of the second data fetched in the multiplier by the first data held in the register.

12. A semiconductor integrated circuit chip according to claim 11, wherein the multiplier outputs a status signal indicating that the multiplier is executing repetitional operation of a multiplication instruction, and wherein the semiconductor integrated circuit chip further comprises:
   a bus cycle control circuit coupled to the CPU via a wait signal line and responsive to the status signal and a succeeding command of the second instruction on the command signal line for providing to the CPU a signal to prolong a bus cycle relating to issuance of the succeeding command of the second instruction from the CPU to the command signal line.

13. A semiconductor integrated circuit chip according to claim 7, wherein the CPU includes:
   an instruction register coupled to the data bus for holding an instruction;
   a control circuit decoding an instruction held in the instruction register and producing control signals; and
   an execution unit whose operation is controlled by the control signals,
   wherein the control circuit is coupled to the command signal line to selectively issue a command of a multiplication instruction according to the decoding of an instruction held in the instruction register.

14. A semiconductor integrated circuit chip comprising:
   a central processing unit (CPU);
   a bus for transmitting an address and data from said CPU;
   a memory coupled to said bus and accessible in response to an access address supplied from said CPU on said bus;
   a multiplier coupled to said CPU via said bus for performing a multiplication on data supplied thereto from said CPU or said memory;
   a command signal line for transferring, from said CPU to said multiplier, a command regarding a multiplication instruction relating to data read out, while the CPU is executing a data preparing operation to provide a data to be multiplied by the multiplier on the bus, wherein the CPU executes said data preparing operation two times in order for one multiplication operation to be effected, the data preparing operation executed the first time provides first data, as data to be multiplied, on the bus, the data preparing operation executed the second time provides second data, as data to be multiplied, on the bus, and the multiplier executes multiplication of the second data and the first data; and
   wherein the multiplier outputs a status signal indicating that the multiplier is executing repetitional operation of a multiplication instruction, and wherein the semiconductor integrated circuit chip further comprises:
      a bus cycle control circuit coupled to the CPU via a wait signal line and responsive to the status signal and a succeeding command for providing to the CPU a signal to prolong a bus cycle relating to issuance of the succeeding command from the CPU to the command signal line.

15. A semiconductor integrated circuit chip according to claim 14, wherein the data and the access address are supplied through said bus by time-division multiplexing.

16. A semiconductor integrated circuit chip comprising:

a central processing unit (CPU);

an address bus coupled to the CPU on which an address is transmitted from the CPU;

a data bus coupled to the CPU on which data is transmitted;

a memory coupled to the address bus and to the data bus, said memory being accessible according to an access address supplied, via said address bus, from the CPU;

a multiplier coupled to the data bus and responsive to a command, from the CPU, regarding a multiplication instruction for fetching data to be multiplied from the data bus and for performing a multiplication on said data fetched therein, said multiplier being isolated from said address bus by not being coupled thereto; and a command signal line for transferring, from said CPU to said multiplier, a command regarding a multiplication instruction relating to data read out, while data is being read out onto said data bus in response to an access address outputted from said CPU to said address bus, to cause the multiplier, isolated from said address bus, to fetch thereinto data directly from said data bus.

17. A semiconductor integrated circuit chip comprising:

a central processing unit (CPU);

an address bus coupled to the CPU on which an address is transmitted from the CPU;

a data bus coupled to the CPU on which data is transmitted;

a memory, coupled to the address bus and to the data bus, and which is accessible according to an access address supplied, via said address bus, from the CPU;

a multiplier coupled to the data bus but not to the address bus and responsive to a command, from the CPU, regarding a multiplication instruction for fetching data to be multiplied from the data bus and for performing a multiplication on data fetched therein; and a command signal line directly coupled between the CPU and the multiplier on which the command regarding the multiplication instruction is transferred from the CPU to the multiplier, wherein the CPU issues the command of the multiplication instruction to the multiplier through the command signal line, while the CPU is executing a data preparing operation to provide data to be multiplied by the multiplier on the data bus, the data preparing operation executed the first time provides first data, as data to be multiplied, on the data bus, the data preparing operation executed the second time provides second data, as data to be multiplied, on the data bus, and the multiplier executes multiplication of the second data and the first data.

* * * * *